United States Patent [19]

Giori

[11] Patent Number: 4,803,489

[45] Date of Patent: Feb. 7, 1989

[54] METHOD FOR DETECTING A CAMOUFLAGED OBJECT AND SYSTEM

[75] Inventor: Francis A. Giori, Williamsville, N.Y.

[73] Assignee: LTV A&D Sierra Research Division, Buffalo, N.Y.

[21] Appl. No.: 68,178

[22] Filed: Jun. 29, 1987

[51] Int. Cl.[4] .............................................. G01S 13/32
[52] U.S. Cl. ........................................ 342/192; 342/27
[58] Field of Search ................... 342/192, 27, 13, 351; 428/919

[56] References Cited

U.S. PATENT DOCUMENTS 3,341,850  9/1967  Kings et al. ...................... 342/192 X
3,500,395  3/1970  Foster et al. .......................... 342/27

OTHER PUBLICATIONS

"Phenomena of Scintillation Noise in Radar Tracking Systems"; Proc. of IRE, May 1959; pp. 855–863; J. H. Dunn et al.
"1–35 GHz Microwave Scattometer"; 1979, IEEE MTT-S, International Microwave Symposium; Orlando, Fla.; May 2, 1979; pp. 551–556.

Primary Examiner—Thomas H. Tarcza
Assistant Examiner—Tod R. Swann
Attorney, Agent, or Firm—Brooks & Kushman

[57] ABSTRACT

A method and system for detecting an object hidden behind and/or under various combinations of optical and/or radar camouflage is disclosed. The radar camouflage is made from material having multiple layers of lossy dielectric and supporting fabric. The optical camouflage is made from material having no special electrical properties but is colored to blend with the supporting scenery. Both types of camouflage material are cut in a random pattern of openings or apertures. The space containing the camouflaged object and other radar-reflective objects is radiated with RF energy at a frequency swept over a predetermined band within the K band of radar frequency bands so that the incident RF waves radiate through the apertures and are re-radiated through the apertures after reflection from the object to create an identifiable scintillation in the reflected RF signal and an enhancement of its average reflectivity at certain frequencies within the predetermined band. A scintillation detection algorithm and a conventional radar thresholding algorithm are performed on the reflected RF energy after it is received and the camouflage object is determined from the objects passing criteria of the two algorithms.

17 Claims, 4 Drawing Sheets

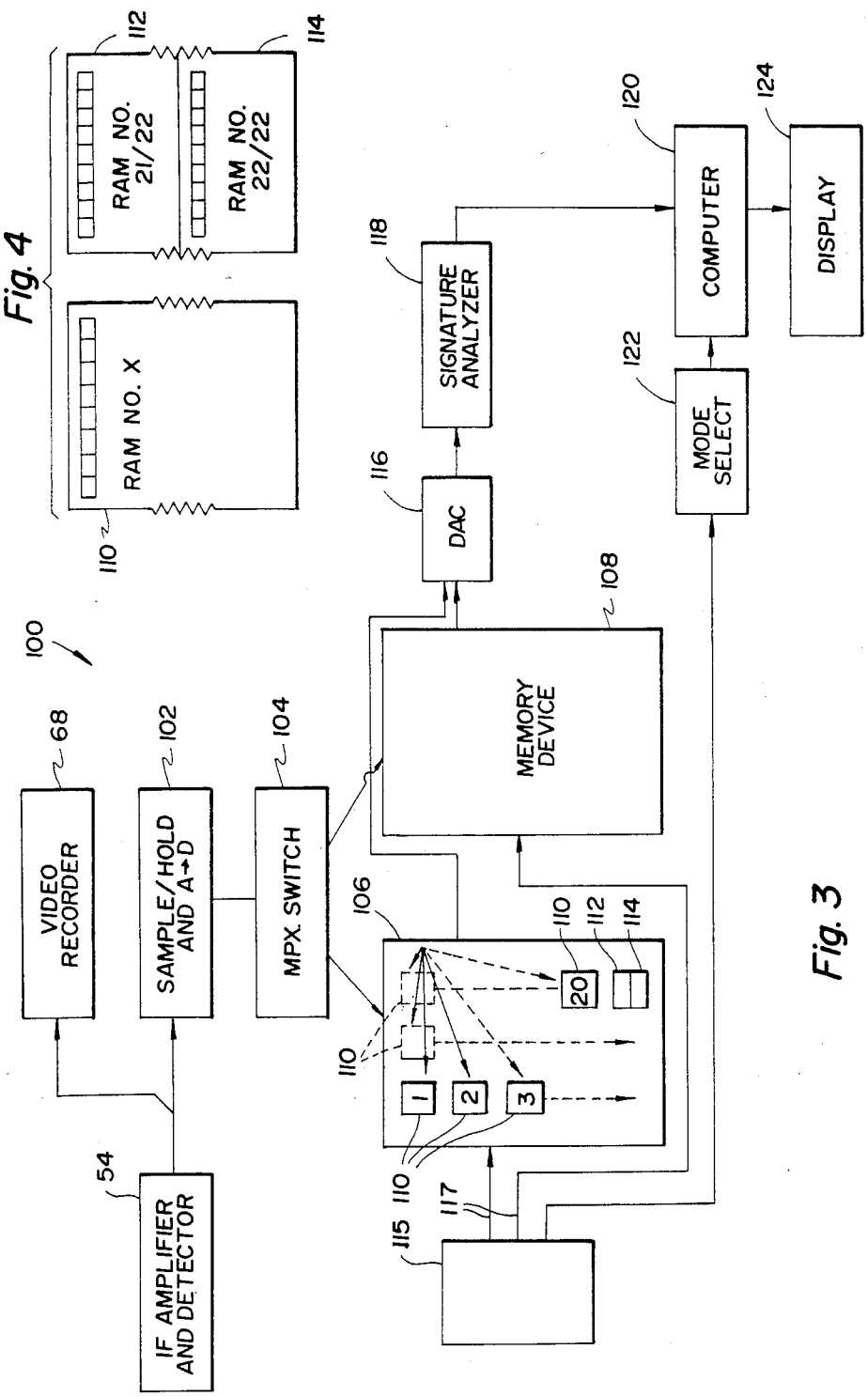

METHOD FOR DETECTING A CAMOUFLAGED OBJECT AND SYSTEM

TECHNICAL FIELD

This invention relates to method and system for detecting, by radar, an object hidden by camouflage and, in particular to method and system for detecting, by radar, an object hidden by camouflage by radiating the space containing the camouflaged object with RF energy at a frequency swept over a predetermined band.

BACKGROUND ART

The basic functions of radar are inherent in the word, which stands for radio detection and ranging. Measurement of target angles is also included as a basic function of most radars and doppler velocity is often measured directly as a fourth basic quantity. Resolution of the desired target from background noise and clutter is a prerequisite to detecting and measurement, and resolution of surface features is essential to mapping or imaging radar.

The radar resolution cell is a four-dimensional volume bounded by antenna beam widths, width of the processed pulse and band width of the receiving filter. Within each such resolution cell, a decision may be made as to presence or absence of a target and, if the target is present, the position may be interpolated to some fraction of the cell dimensions.

A typical radar system includes a transmitter subsystem, an antenna subsystem and a receiver and signal processor subsystem. The radar system also includes a synchronizer which controls the time sequence of transmissions, receiver gates and gain settings, signal processing and display. When called for by the synchronizer, a modulator of the transmitter applies a pulse of high voltage to an RF amplifier, simultaneously with an RF drive signal from an exciter of the radar system. The resulting high power RF pulse is passed through a transmission line or a wave guide to a duplexer which connects it to the antenna subsystem for radiation into space.

Many radar antennas are of the reflector type and are steered mechanically by a servo-driven pedestal. Alternatively, a stationary array may be used with electrical steering of the radiated beam.

After reflection from a target or object, the echo signal reenters the antenna which is connected to a preamplifier or mixer of the receiver subsystem by the duplexer. A local oscillator signal furnished by the exciter of the system translates the echo frequency to an intermediate frequency (I.F.) which can be amplified and filtered in the receiver prior to more refined signal processing. The processed I.F. signal is passed through an envelope detector and displayed with or without video processing.

Any device that detects and locates objects or targets by radiating electromagnetic energy and uses the echo scattered from the target can be classified as a radar no matter what its frequency. Radars have been operated at wave lengths of 100 meters or longer to wave lengths of $10^{-7}$ meters or shorter. The basic principles are the same with any frequency, but the implementation is widely different. In practice, most radars operate within the microwave frequency range, but there are many notable exceptions.

A set of letter designations exist for the frequency bands commonly used for radar. Original code letters (P, L, S, X, and K) were introduced during World War II. After the need for secrecy no longer existed, these designations remained. Others were added later (C, $K_u$ and $K_a$) as new bands were opened and some were seldom used (P and K). The K-band has a frequency range of 18 to 26.5 GHz.

Radar targets or objects consisting of multiple scattering elements whose phase relationships cause fluctuations in signal amplitude are subject to errors in radar position measurements. The apparent source of the composite echo signal wanders back and forth across the target, and at times the signal appears to originate from points well beyond the physical spread of the target itself. In principle, the variance in position measurement is infinite for a measuring system with unlimited dynamic range and bandwidth. However, for practical systems this target "glint" and "scintillation" error is closely approximated by an gaussian distribution.

One way of camouflaging objects or targets from radar is to use various combinations of optical and radar camouflage. Radar camouflage typically is made from material having multiple layers of lossy dielectric and supporting fabric. Optical camouflage typically is made from material having no special electrical properties but is colored to blend with surrounding scenery. In both cases, the material is cut to produce a random pattern of openings or apertures.

DISCLOSURE OF THE INVENTION

An object of the present invention is to provide a method and system for detecting, by radar, objects hidden behind and/or under various combinations of optical and radar camouflage which has been cut to produce apertures extending therethrough.

Another object of the present invention is to provide a method and system for detecting an object hidden by camouflage having apertures extending completely therethrough wherein the space containing the camouflaged object is radiated with RF energy at a frequency swept over a predetermined band so that the incident RF waves radiate through the apertures and are reradiated through the apertures after reflection from the hidden object to cause, by this redirection, identifiable scintillation in the reflected signal, as well as enhancement of the average reflectivity.

Yet still another object of the present invention is to provide a method and system for discriminating an object hidden behind and/or under camouflage having apertures extending completely therethrough from other radar-reflective objects.

In carrying out the above objects and other objects of the present invention, a method is provided for detecting, by radar, an object hidden by camouflage having apertures extending completely therethrough. The method includes the steps of radiating the space containing the camouflaged object with RF energy at a frequency swept over a predetermined band so that the incident RF waves radiate through the apertures and are reradiated through the apertures after reflection from the object to create an identifiable scintillation in the reflected RF signal and an enhancement of its average reflectivity. The method further comprises the steps of receiving reflected RF energy, including the reflected RF signal and performing a scintillation detection algorithm on the received RF energy to detect the camouflaged object.

A radar system utilizing the method of the present invention includes a transmitter means for generating RF energy having an output frequency variable over a desired range at a predetermined sweep rate appropriate for the selected radar pulse rate frequency (PRF) and antenna scan rate. The system further includes antenna means coupled to the transmitter means for radiating the RF energy into the space containing the camouflaged object and for receiving reflected RF energy from the space containing the camouflaged object. A receiver means is coupled to the antenna means for amplifying the received RF energy and converting the frequency of the received RF energy to an intermediate frequency. Finally, means are provided for performing a scintillation detection algorithm on the received RF energy to detect the camouflaged object.

A method and system is also provided for discriminating the hidden object from other radar-reflective objects which are not so camouflaged. A radar thresholding algorithm is performed having radar thresholding criteria on the received RF energy as well as the scintillation detection algorithm to determine which objects pass the scintillation criteria and which objects pass the radar thresholding criteria. The camouflaged object is then determined from the objects passing the scintillation and radar thresholding criteria.

Preferably, the frequency of the RF energy lies in the K band of radar frequency bands.

The method and system as described above provide numerous advantages. For example, an object hidden by a camouflage having apertures extending completely therethrough can be detected. Also, an object hidden by such camouflage can be detected and discriminated from other radar-reflective objects.

Other advantages of the present invention will be readily appreciated as the same become better understood by reference to the following detailed description when taken in connection with the accompanying drawings.

BRIEF DESCRIPTION OF THE DRAWINGS

FIG. 3 is a schematic block diagram of video signal processing logic for use in analyzing the reflected RF energy after it is received;

FIG. 4 is a schematic diagram illustrating the two types of storage elements utilized within the storage areas depicted in FIG. 3.

BEST MODE FOR CARRYING OUT THE INVENTION

Figure 1:
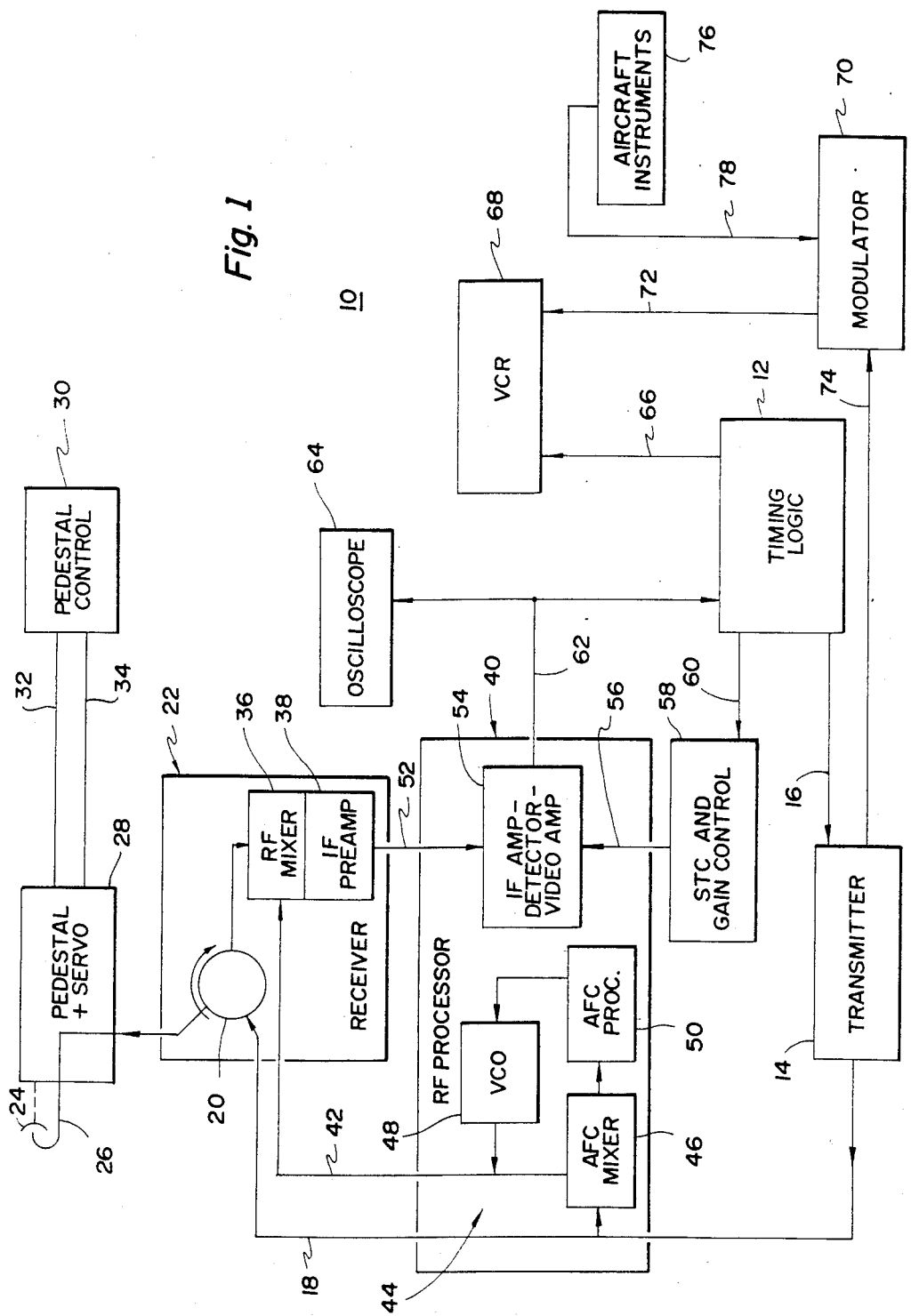
FIG. 1 is a schematic block diagram of a radar system constructed in accordance with the present invention.

Referring now to the drawings, there is illustrated in FIG. 1 a radar system collectively indicated by the reference numeral 10, for detecting an object hidden by camouflage having apertures extending completely therethrough. For purposes of this application, the term "camouflage" refers to various combination of optical and radar camouflage behind and/or under which the object or target is hidden. Radar camouflage typically is made from material having multiple layers of lossy dielectric and supporting fabric. Optical camouflage is typically made from material having no special electrical properties but rather is colored to blend with the surrounding scenery. In either case, the material is typically cut in a random pattern of openings or apertures.

Applicant has discovered that the reflected RF energy from objects hidden by such camouflage exhibits very strong scintillation and, at some frequencies within the K band of frequencies, have as much as 20 dB greater reflected energy from the object/camouflage combination than from the object alone. One possible explanation, which has been at least partially validated in subsequent tests, is that the energy reflected from the object was re-radiated via the apertures in the camouflage, and that at certain frequencies the re-radiation pattern in effect synthesized a directive "antenna" which, in turn, resulted in a larger return than the normally expected attenuated return.

Tests performed in the X band of radar frequencies showed negligible scintillation with variation of transmitted frequency. This is in contrast to operation in the K band where sizeable scintillation correlated with frequency sweep. At wave lengths of visible light scintillation is high, but so closely spaced in frequency (i.e. color) as to be undetectable. Consequently, for a target covered with at least a single layer of camouflage of the type previously mentioned, the K band has a wave length short enough to cause some significant scintillation with frequency variation yet long enough to have useful coherent interference.

Referring again to FIG. 1, the radar system 10 is a pulsed radar system whose operation is initiated by a synchronizer or timing logic 12 which, in general, controls the time sequence of transmissions, receiver gates and gain settings, signal processing and display.

The system 10 also includes a transmitter 14 which is connected to the timing logic 12 along a line 16 to receive a pulse rate frequency signal. The transmitter includes a modulator, a magnetron and an RF amplifier which receives a high voltage pulse from the modulator. The transmitter 14 has a turning rate of approximately 1,000 MHz per second. The tuning drive of the transmitter 14 includes a free-running, two-phase gear-motor coupled to tuning cavities by a scotch yoke. Consequently, the transmitter frequency will sweep up and down over the maximum tuning band (i.e. approximately 1,000 MHz for each cycle of scotch yoke rotation). Each up-down tuning cycle will take just under one second. To obtain faster tuning, for example greater than or equal to 40 Hz, the magnetron of the transmitter 14 may include a voice coil driver.

The resulting high power RF pulse is passed through a transmission line or wave guide 18 and through a duplexer 20 of a receiver, generally indicated at 22. In turn, the duplexer 20 couples the RF pulse to an antenna 24 along line 26 for radiation into a space which contains the camouflaged object and other radar-reflective objects.

The antenna 24 is of the reflector type and is steered mechanically by a pedestal which is driven by a servo, the combination of which is indicated at 28. Pedestal control circuitry 30 provides a motor drive signal along line 32 and receives resolver data from the servo along line 34 to control movement of the pedestal and, consequently, movement of the antenna 24. However, it is to be understood that a stationary antenna array may also be used with electrical steering of the radiated beam without departing from the spirit of the present invention. Also, preferably, when mounted in an airplane the antenna 24 is fixed in a side-locking mode in order to cover the search area.

The antenna 24 radiates the space containing the camouflaged object with the RF energy at a frequency swept over a predetermined band so that the incident RF waves radiate through the apertures in the camouflage and are re-radiated through the apertures after reflection from the hidden object. The redirection causes an identifiable scintillation to occur in the reflected signal as well as an enhancement of the average reflectivity on the order of 20 dB at certain frequencies within the band of frequencies.

After reflection from the camouflaged target, the reflected RF energy reenters the antenna 24 and is coupled by the duplexer 20 to an RF mixer 36 of the receiver 22. In turn, the RF mixer is coupled to an IF pre-amplifier 38 which, preferably, has a 10 Mz bandwidth at 3 dB. The mixer 36 converts the modulated RF signal to an intermediate frequency (IF) as described in detail immediately below.

An RF processor, generally indicated at 40, of the system 10, receives a portion of the high power RF pulse appearing on the line 18 and provides a local oscillator signal along line 42 which is utilized by the RF mixer 36 to translate or convert the modulated RF signal to the intermediate frequency signal. In particular, the RF processor 40 includes an automatic frequency control circuit or loop, generally indicated at 44, which provides the local oscillator signal. The loop 44 includes an AFC mixer 46 which receives a portion of the high power RF pulse appearing on the line 18. A second input to the AFC mixer 46 is provided by a voltage controlled oscillator (VCO) 48 which, in turn, is coupled to an AFC processor 50. The processor 50 provides an output voltage which controls the VCO 48 in response to an output signal from the AFC mixer 46.

The output of the IF preamplifier 38 is coupled along line 52 to an IF amplifier/envelope detector/video amplifier circuits 54 of the RF processor 40 to convert the IF signal to a video signal in response to a gain control voltage appearing on line 56. The gain control voltage is provided by a sensitivity time control (STC) and gain control circuits 58. The circuits 58, in turn, are coupled to the timing logic 12 and receive synch pulses along line 60 to synchronize the signal processing with the timed sequence of transmission.

Briefly, the radar system 10 has the following properties and characteristics:
1. range—approximately 10 mi(clear air or light rain);
2. pulse rate frequency (PRF)—1,900 to 2000 pps;
3. peak RF power—30 to 40 kW;
4. transmitted pulsewidth—0.3 microseconds;
5. transmitter Du—0.0006;
6. transmitter pressurized with dry nitrogen;
7. tuning speed—approximately 1,000 MHz per second (controlled by mechanical tuning drive);
8. receiver (IF) bandwidth—10 MHz at 3 dB;
9. receiver tracking accuracy better than 2 MHz;
10. receiver sensitivity time control (STC)—10 to 20 dB; and
11. receiver manual gain—0-70 dB.

The resulting output video signal from the RF processor 40 appears on a line 62 which is provided as an input to an oscilloscope 64 which is used to monitor the correct adjustment of the STC and gain control circuits 58. The video output signal appearing on line 62 is also provided as an input to the timing logic 12 which, in turn, provides the video signal, together with a synch pulse along line 66 to a commercially available analog video recorder, such as a VCR 68. Such VCR's have modest signal-to-noise ratio. The synch pulse is provided to operate the VCR correctly since most commercially available VCR's will not operate correctly without proper horizontal and vertical synch pulses. To prevent overlapping of data and synch pulses with consequent interference among the signals, the pulses to the transmitter along line 16 from the timing logic 12 are timed to be synchronous with a submultiple of the horizontal pulse rate appearing on line 66. A pulse rate frequency one-eighth of the horizontal synch rate (approximately 1968 pps) is sufficient. Also, the phasing of the pulses appearing on lines 16 is adjusted so that the radar returns of interest fall between synch pulses appearing on line 66. The timing logic 12 preferably includes a master clock and divider chain to provide the appropriate timing for recording radar returns without signal interference.

The system 10 also includes a modulator circuit 70 to provide FM signals along line 72 to the VCR 68. One FM signal includes transmitter frequency and the other FM signal includes aircraft position (or accurate time). The FM signals are recorded on two audio tracks on the VCR 68.

A transmit frequency signal is provided on an input line 74 to the circuit 70 from the transmitter 14. Aircraft instruments 76 provide input signals along line 78 to the circuit 70. In this way, time correlation is maintained among the radar returns, transmit frequency and aircraft position via the data recorded by the VCR 68.

Figure 2:
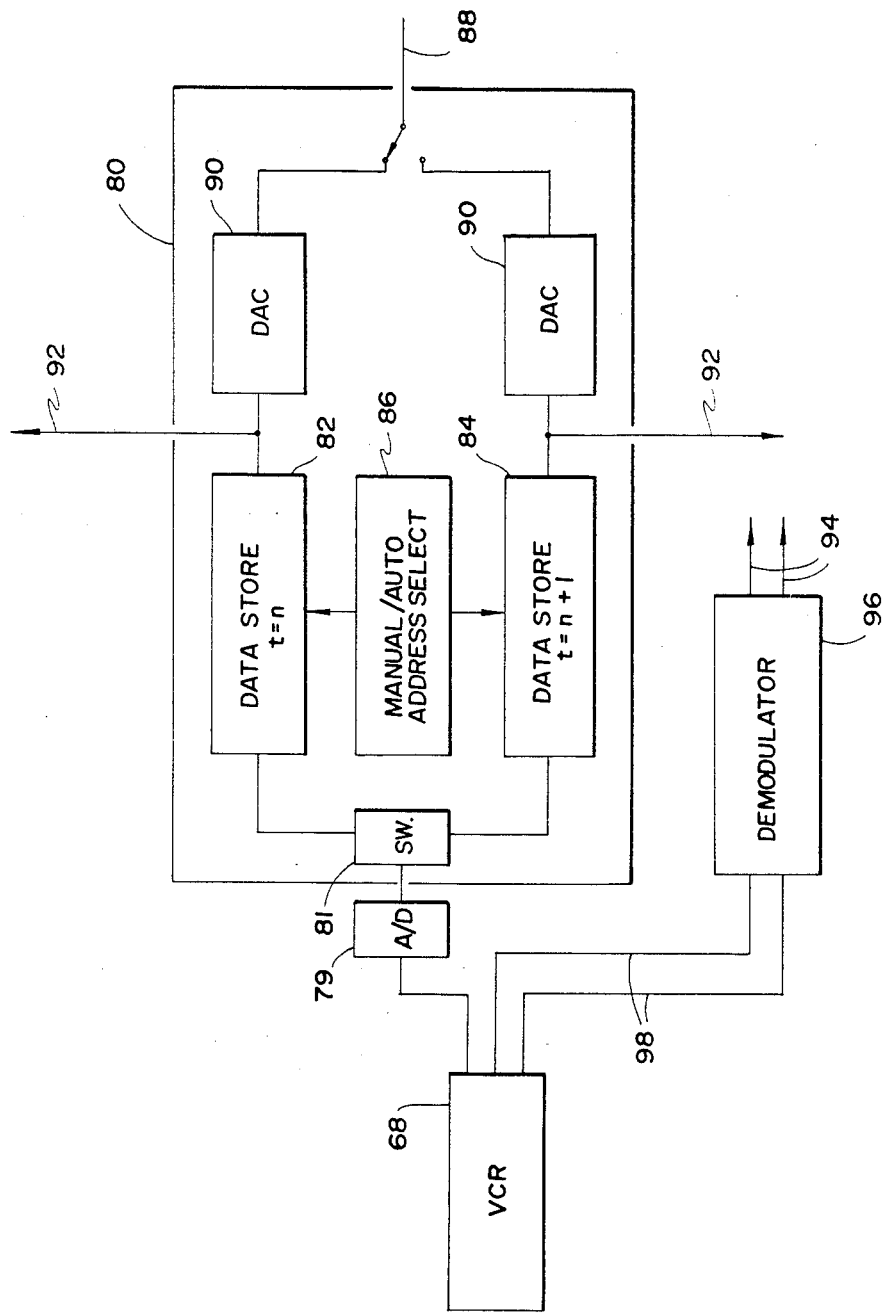
FIG. 2 is a schematic block diagram of a data retrieval unit of the system.

Referring now to FIG. 2, there is illustrated a subsystem 80 for playback of the data stored in the VCR 68. The subsystem 80 includes first and second memory devices 82 and 84. Each of the memory devices 82 and 84 stores radar video data previously digitized by an A to D converter 79 and pertaining to one complete frequency sweep (approximately 2,000 radar pulses).

A multiplexor switch 81 of the subsystem 80 alternately stores the digitized video signal in the two memory devices 82 and 84. Each of the memory devices 82 and 84 stores data from one complete frequency sweep in a number of separate static RAM's. In the present embodiment one frequency sweep takes about one second. The present embodiment contains 22 RAM's, each one having 8 x 2048 bit capacity. The desired number of RAM's depends on the size of range bins, and the maximum-minimum range to be covered. An address selector 86 is provided for inserting and removing the data to and from its appropriate location within the RAM's.

The two memory devices 84 and 82 are provided so that when one of the memory devices 82 or 84 is being filled, the other is available to provide data for data processing. Consequently, the two memory devices 82 and 84 contain all the data needed for processing two frequency sweeps (up-down or down/up). The data in the memory devices 82 or 84 can be alternately stored and played back in real time or can be frozen for fine-grained analysis of any two seconds worth of flight data. The system 80 lends itself to manual slow-time review by a human operator along line 88 after converting the digitized data signals to analog signals by either one of D to A converters 90. Alternatively, high speed acceptance-rejection of target returns can be performed by a computer (not shown) which is coupled to the digital data along lines 92. The computer also receives digital data along lines 94 from a demodulator circuit 96 which demodulates the FM data appearing on lines 98 from the VCR 68. The data includes transmitter frequency data and aircraft position data.

Referring now to FIG. 3, there is illustrated the general arrangement for storing the video data and processing the return signature within the video data within a signature processing subsystem, generally indicated at 100. The subsystem 100 includes sample and hold and A to D converter circuitry 102 which converts the instantaneous amplitude of the radar video signal to digital form. A multiplexor switch 104 of the subsystem 100 alternately stores the converted signal in two identical sets of RAM's contained within memory devices, generally indicated at 106 and 108, respectively. Each set of RAM's contains all of the data obtained from one entire frequency sweep of the transmitter 12. Preferably, one 8 by 2,048 bit RAM is provided for each range bin and wherein preferably 20 range bins are provided in each of the memory devices 106 and 108 for the video data. As transmitted frequency is swept, the corresponding video amplitude is stored in new locations in each video RAM 110. For example, a first radar pulse goes in the same location in all of the range bin RAM's 110. Correspondingly, if the same location is addressed in each of the range bin RAM's, the one frequency is reconstituted (i.e. the same video as would be obtained from a fixed frequency radar).

Data RAM 112 is used for storing the corresponding transmit frequency and data RAM 114 is utilized for storing such variables as antenna angles, aircraft position data and/or time obtained from a logic circuit 115 along lines 117. The logic circuit 115 is coupled to the timing logic 12 and the aircraft instruments 76 to obtain the data stored in the RAM's 112 and 114.

Under control of the logic circuit 115 the digital signals contained within the memory device 106 and 108 are coverted to analog signals by a digital-to-analog converter 116 and thereafter coupled to a signature analyzer 118 which applies various scintillation and radar thresholding criteria to the digitized images. A programmed computer 120 then controls a display or monitor 124 to selectively display either the target which meets the scintillation criteria, the target which meets the radar threshold criteria or a logical combination thereof in response to a mode select switch 122. The computer 120 preferably is a microcomputer. The mode select switch 122 is preferably automatically controlled by the logic circuit 115.

Consequently, it can be readily understood that by using the memory devices 106 and 108 signature analysis can be performed to identify camouflaged objects as well as perform normal radar detection. For example, during a given frequency sweep the target or range bins (i.e. RAM numbers) 3, 9 and 15 met certain scintillation criteria, but also assume that those in bins 3 and 15 also met conventional radar thresholding criteria. The control logic within the computer 120 would say that bin 9 contains the camouflaged object.

Figure 5:
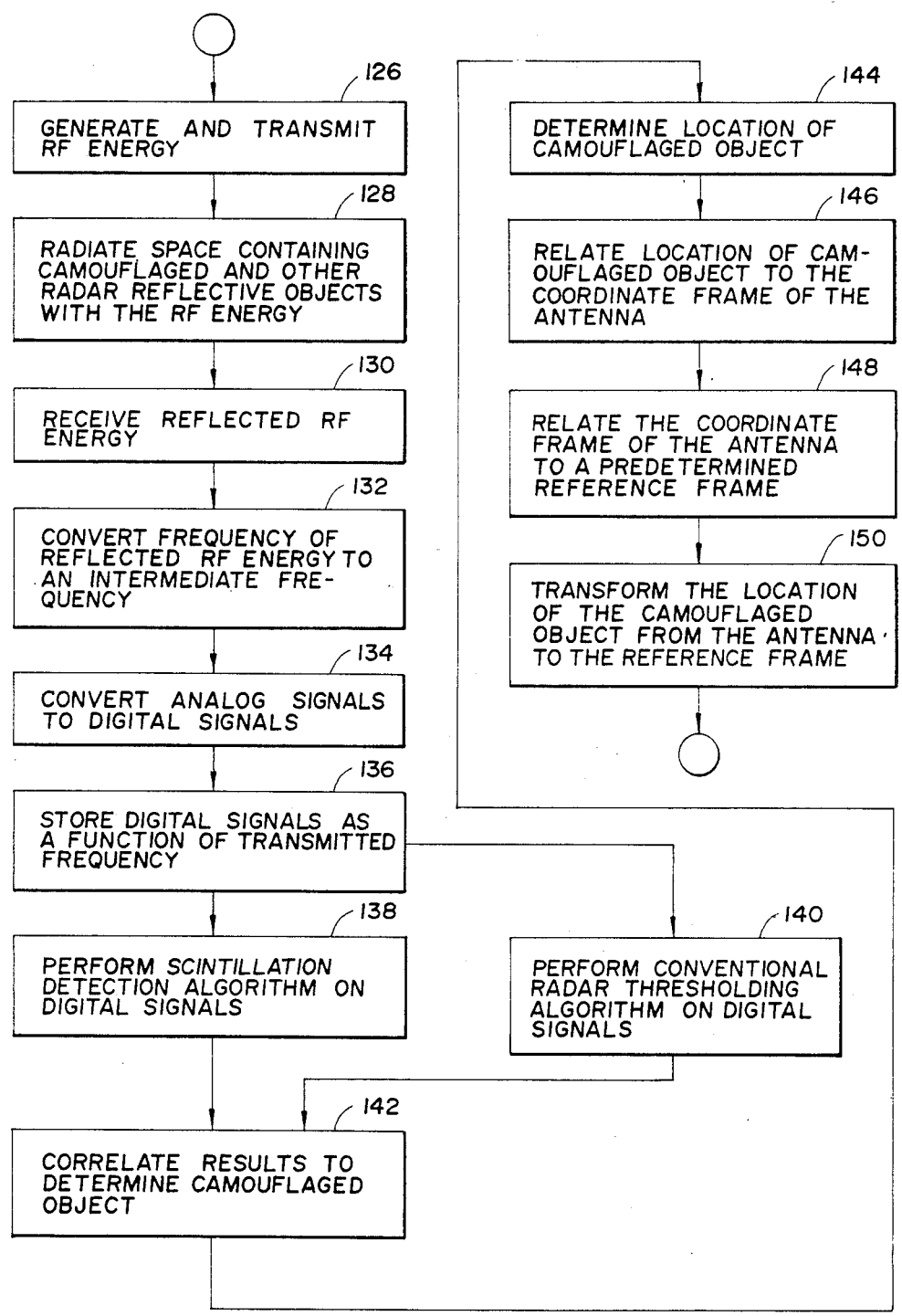
FIG. 5 is a flow chart illustrating various steps utilized in carrying out the method of the present invention.

Referring now to FIG. 5, there is illustrated the steps taken in accordance with the method of the present invention.

In step 126, the transmitter 14 generates and transmits the RF energy to the duplexer 20.

In step 128, the antenna 24 radiates space containing the camouflaged and other radar-reflective objects with the RF energy.

In step 130, the radar 24 receives the reflected RF energy.

In step 132, the RF mixer 36 converts the frequency of the received RF energy to an intermediate frequency.

In step 134, the analog video signal is converted to digital signals.

In step 136, the digital signals are stored as a function of the transmitted frequency.

In step 138, the signature analyzer 118 perform a scintillation detection algorithm on the analog signals.

In step 140, the signature analyzer 118 performs a conventional radar thresholding algorithm on the analog signals.

In step 142, the signature analyzer 118 correlates the results from the algorithms to determine the camouflaged object.

In step 144, the signature analyzer 118 determines the location of the camouflaged object with respect to its radar resolution cell.

In step 146, a first set of calibration data is generated relating the location of the camouflaged object to the coordinate frame of the antenna. This step is typically performed prior to video data collection. The position of the camouflaged object is then logged as a function of time with respect to an airplane and, consequently, to the antenna.

In step 148, a second set of calibration data is generated relating the coordinate frame of the antenna to a predetermined reference frame, such as with respect to ground benchmarks on which the camouflaged object is located. To obtain location of the camouflaged object or objects, the aircraft location with respect to ground benchmarks is determined as a function of time. The straightforward trigonometric operation of adding the aircraft vector to that of the camouflaged object, can be carried out either in real time, in the aircraft or can be done later from time synchronized data. This data can be provided by a ground reference navigation system, such as INS, Doppler radar, GPS or other ground reference navigation systems. Accurately time-tagged aircraft location can be obtained from an FPS 16 tracking radar or from Air Force owned RBS tracking radars.

Finally, in step 150, the location of the camouflaged object is transformed from the antenna frame to the reference frame.

The advantages accruing to the method and system of the present invention are numerous. For example, the method and system detect objects hidden behind and/or under various combinations of optical and/or radar camouflage which has been cut to produce a random pattern of openings or apertures. Also, the method and system of the present invention may be utilized to differentiate camouflaged objects from other radar-reflective objects.

The invention has been described in an illustrative manner, and, it is to be understood that the terminology which has been used is intended to be in the nature of words of description, rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A method for detecting by radar an object hidden by camouflage within a predetermined space, wherein the camouflage has apertures extending completely therethrough, the method comprising the steps of:

activating a radar system to generate RF energy radiating the predetermined space containing the camouflage object said RF energy being generated at a frequency swept over a predetermined frequency band so that said generated RF energy radiates through the apertures of the camouflage and is radiated through the apertures after reflection from the object to create an identifiable scintillation in the reflected RF energy;

receiving the reflected RF energy to generate a received RF signal; and performing a scintillation-detection algorithm on said received RF signal to detect the camouflaged object.

2. A radar system for detecting an object hidden by camouflage within a predetermined space, wherein the camouflage has apertures extending completely therethrough, the system comprising:

transmitter means for generating pulsed RF signals, having a frequency which is variable over a desired frequency range at a predetermined sweep rate, the sweeping of said frequency over said desired frequency range being repeated at a selected rate antenna means coupled to said transmitter means for radiating RF energy in response to said RF signal into the predetermined space containing the camouflaged object to cause the camouflaged object to scintillate at said selected rate and for receiving the portion of the radiated RF energy reflected from the space containing the camouflaged object to generate a received RF signal having a frequency corresponding to the frequency of the radiated RF signal;

receiver means coupled to said antenna means for amplifying said received RF signal to generate an amplified RF signal; and means for performing a scintillation-detection algorithm on said amplified RF signal to detect the camouflaged object.

3. A method for discriminating by radar an object hidden by camouflage from other radar-reflective objects within a predetermined space wherein the radar includes means for emitting RF energy into the predetermined space and the camouflage has apertures extending completely therethrough, the method comprising the steps of:

radiating the predetermined space containing the camouflaged object and other radar-reflective objects with the RF energy emitted by said radar at a frequency swept over a predetermined frequency band so that the emitted RF energy radiates through the apertures of the camouflage and is re-radiated through the apertures after reflection from the hidden object, the RF energy reflected from the hidden object having an identifiable scintillation at at least one frequency of said RF energy within said predetermined frequency band;

receiving said reflected RF energy to generate a received RF signal;

performing a scintillation-detection algorithm having scintillation criteria and performing a radar thresholding algorithm having radar thresholding criteria on said received RF signal to determine which objects pass the scintillation criteria and which objects pass said radar thresholding criteria; and determining the camouflaged object from the other radar-reflective objects which pass said scintillation and radar thresholding criteria.

4. A radar system for detecting and discriminating within a predetermined space containing objects hidden by camouflage from other radar-reflective objects, the camouflage having apertures extending completely therethrough, the radar system comprising:

transmitting means for generating RF energy at a frequency variable over a desired frequency and at a selected pulse repetition frequency, said desired frequency range selected to cause the object hidden by camouflage to have enhanced reflectivity at at least one frequency within said desired frequency range, said transmitting means including means for varying said frequency of said RF energy at a predetermined sweep rate;

antenna means coupled to said transmitter means for radiating said RF energy into the predetermined space containing the camouflaged object and the other radar-reflective objects and for receiving RF energy from the predetermined space reflected from the camouflaged object and the other radar-reflective objects to generate a received RF signal whose frequency corresponds to said frequency of said radiated RF energy;

receiver means coupled to said antenna means for amplifying said received RF signal and for converting said frequency of said RF signal to an intermediate frequency;

means for performing a scintillation-detection algorithm having scintillation criteria and a radar thresholding algorithm having radar threshold criteria on said received RF signal to determine which objects pass said scintillation criteria and which objects pass said radar thresholding criteria; and logic means for determining the camouflaged object from among the objects passing said scintillation and said radar thresholding criteria.

5. The invention as claimed in claim 1 or claim 2 or claim 3 or claim 4 wherein the frequencies of said RF energy lies in the k band of radar frequency bands.

6. The invention as claimed in claim 5 wherein the frequencies of said RF energy lies in the $H_2O$ absorption band of radar frequency bands.

7. The invention as claimed in claim 6 wherein the frequency of said RF energy is variable over a bandwidth less than 10 GHz and in excess of 0.1 GHz.

8. The invention as claimed in claim 7 wherein the frequency of said RF energy is variable over a bandwidth less than 2 GHz and in excess of 0.1 GHz.

9. The invention as claimed in claim 8 wherein the frequency of said RF energy is swept at a sweep rate in excess of one sweep per second.

10. The invention as claimed in claim 9 wherein said sweep rate is in excess of 10 sweeps per second.

11. The invention as claimed in claim 2 or claim 4 wherein the antenna means is a single antenna.

12. The invention as claimed in claim 2 or claim 4 including an oscillator, the output of the oscillator being coupled to said receiver means, and having a frequency which is a function of the output frequency of the transmitter means.

13. The invention as claimed in claim 1 or claim 2 or claim 3 or claim 4 wherein the camouflage is a layer of cloth material.

14. The method as claimed in claim 1 or claim 3 wherein said RF energy is radiated from an antenna.

15. The method as claimed in claim 14 and further comprising the steps of determining the location of the detected camouflaged object and generating a first set of calibration data relating the location of said camouflaged object to the coordinate frame of the antenna.

16. The method as claimed in claim 15 further comprising the step of generating a second set of calibration data relating the coordinate frame of said antenna to a predetermined reference frame.

17. The method as claimed in claim 16 further comprising the step of transforming the location of the camouflaged object from said coordinate frame of said antenna to said predetermined reference frame.

* * * * *